United States Patent
Veeramani et al.

(10) Patent No.: US 10,609,283 B2
(45) Date of Patent: Mar. 31, 2020

(54) SHARING PANORAMIC VIDEO IMAGES OVER A WIRELESS DISPLAY SESSION

(71) Applicant: Intel Corporation, Santa Clara, CA (US)

(72) Inventors: Karthik Veeramani, Hillsboro, OR (US); Rajneesh Chowdhury, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 114 days.

(21) Appl. No.: 15/477,060

(22) Filed: Apr. 1, 2017

(65) Prior Publication Data

US 2018/0288319 A1 Oct. 4, 2018

(51) Int. Cl.
| | |
|---|---|
| H04N 5/232 | (2006.01) |
| G11B 27/036 | (2006.01) |
| H04N 21/2343 | (2011.01) |
| H04N 21/236 | (2011.01) |
| H04N 5/262 | (2006.01) |
| H04N 5/341 | (2011.01) |
| H04N 7/52 | (2011.01) |
| H04N 21/258 | (2011.01) |
| H04N 21/218 | (2011.01) |
| H04N 21/81 | (2011.01) |
| H04N 5/268 | (2006.01) |
| H04N 21/2368 | (2011.01) |
| H04N 21/239 | (2011.01) |
| H04N 21/8352 | (2011.01) |
| H04N 21/4363 | (2011.01) |
| H04N 7/18 | (2006.01) |

(52) U.S. Cl.
CPC ......... *H04N 5/23238* (2013.01); *H04N 5/268* (2013.01); *H04N 5/2624* (2013.01); *H04N 7/181* (2013.01); *H04N 7/52* (2013.01); *H04N 21/21805* (2013.01); *H04N 21/2368* (2013.01); *H04N 21/2393* (2013.01); *H04N 21/25825* (2013.01); *H04N 21/43637* (2013.01); *H04N 21/816* (2013.01); *H04N 21/8352* (2013.01); *H04N 2201/3226* (2013.01)

(58) Field of Classification Search
None
See application file for complete search history.

(56) References Cited

U.S. PATENT DOCUMENTS

| | | | | |
|---|---|---|---|---|
| 2007/0014413 | A1* | 1/2007 | Oliveira | G06F 21/10 380/278 |
| 2008/0253685 | A1* | 10/2008 | Kuranov | G06T 3/4038 382/284 |
| 2013/0266065 | A1* | 10/2013 | Paczkowski | H04N 21/4728 375/240.12 |

(Continued)

*Primary Examiner* — Edemio Navas, Jr.
(74) *Attorney, Agent, or Firm* — Jordan IP Law, LLC

(57) ABSTRACT

Systems, apparatuses and methods may provide for technology that transmits and processes panoramic video images in wireless display devices. Multiple video streams may be captured by one or more video cameras and transmitted from a transmitter to the receiver, and each of the video streams may be tagged with an identifier. The identifiers may be used by the receiver to determine an order in which the panoramic video images will be processed and stitched by the receiver, and rendered on a display device.

25 Claims, 9 Drawing Sheets

(56) References Cited

U.S. PATENT DOCUMENTS

| | | | | |
|---|---|---|---|---|
| 2015/0055937 A1* | 2/2015 | Van Hoff | ............ | H04N 13/243 |
| | | | | 386/285 |
| 2015/0373296 A1* | 12/2015 | Ushiyama | .............. | H04N 5/765 |
| | | | | 725/91 |
| 2016/0191798 A1* | 6/2016 | Yoo | ........................ | H04N 19/23 |
| | | | | 348/36 |
| 2016/0219606 A1* | 7/2016 | Amano | ............. | H04N 1/00217 |
| 2016/0337706 A1* | 11/2016 | Hwang | ............ | H04N 21/23614 |
| 2018/0183847 A1* | 6/2018 | Poornachandran | ... | H04L 65/601 |

* cited by examiner

SHARING PANORAMIC VIDEO IMAGES OVER A WIRELESS DISPLAY SESSION

BACKGROUND

Technical Field

Embodiments described herein generally relate to networking applications. More particularly, embodiments relate to the transmission of panoramic video images over a wireless display session.

Discussion

Wireless display devices may include a transmitter that transmits video streams wirelessly to a receiver using technology such as Miracast®. The Miracast® Revision 1 (R1) standard only supports the wireless transmission of a single video stream from the transmitter to the receiver. The Miracast® Revision 2 (R2) standard, on the other hand, may include an additional video stream—an auxiliary video stream, that allows an additional image or video to be transmitted, allows the addition of subtitles, or allows the addition of picture-in-picture videos.

Presently, there is no available mechanism to transmit panoramic video images using Miracast® technology unless the transmitter is capable of assembling or stitching multiple video streams from multiple video sources as a single video stream. This may not be possible if the transmitter is a low power device, such as a drone.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION OF EXEMPLARY EMBODIMENTS

Figure 1:
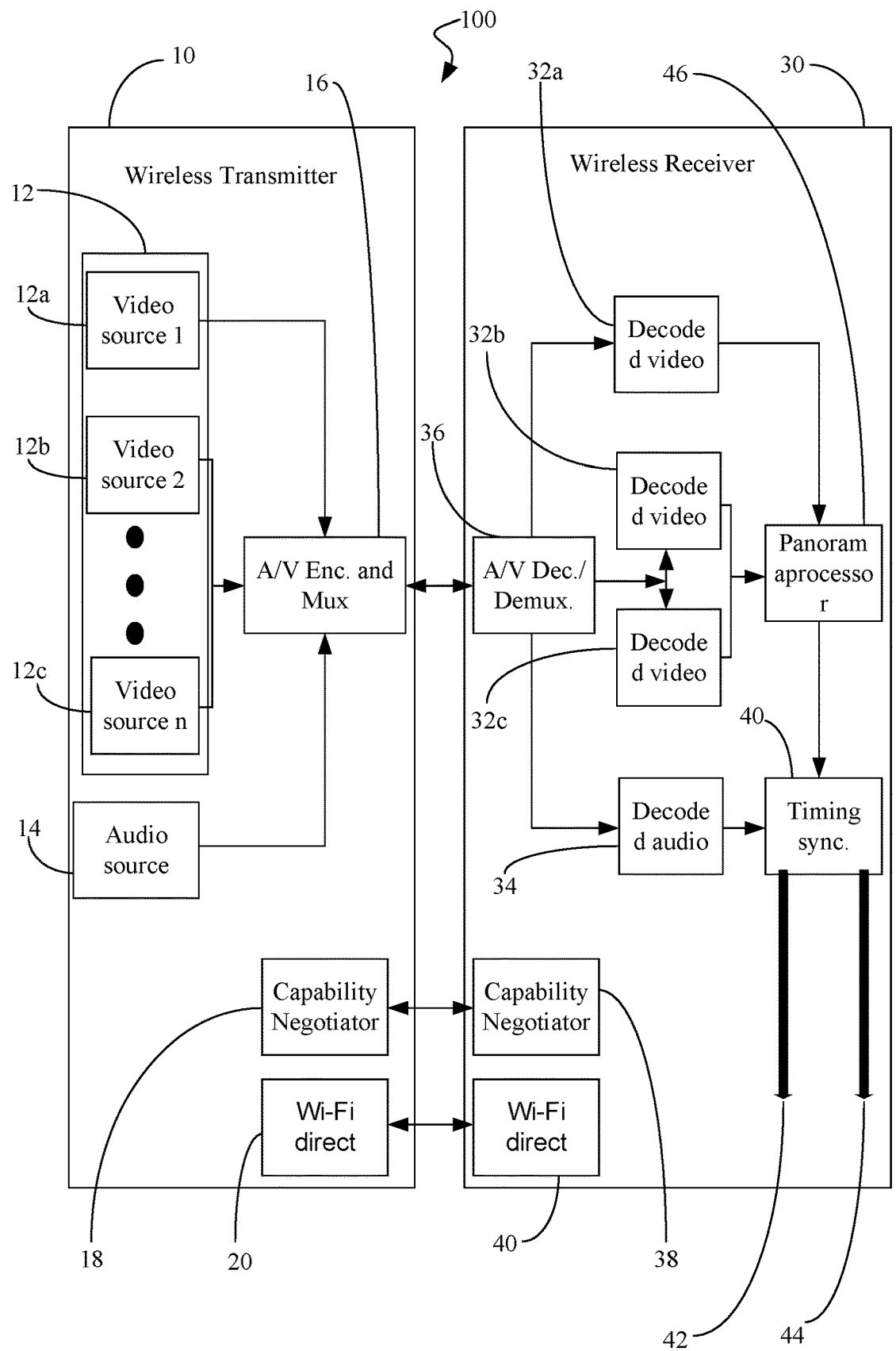
FIG. 1 is block diagram of an example of a panoramic video transmission system according to an embodiment.

Turning now to FIG. 1, a panoramic video transmission system 100 is illustrated. The panoramic video system 100 may generally include a transmitter 10 and a receiver 30. The transmitter 10 and the receiver 30 may be a wireless transmitter and a wireless receiver, and may include, but are not limited to, mobile telephones, portable computers with wireless communication capabilities, personal digital assistants (PDAs), portable media players, other devices with wireless communication capabilities, including "smart" phones, "smart" televisions, and "smart" pads or tablets, or other types of wireless communication devices. One or more of the transmitter 10 (or source device) and the receiver 30 (or sink device) may also include wired devices such as televisions, desktop computers, monitors, projectors, and the like.

The transmitter 10 of the panoramic video transmission system 100 may include one or more video sources 12 (12a-12c), one or more audio sources 14, an audio/video (A/V) encoder and multiplexer 16, a capability negotiator 18, and a standard-specific Wi-Fi direct connector 20. The standard-specific Wi-Fi direct connector 20 allows Wi-Fi devices to be connected in a peer-to-peer manner even though the devices are not connected in a typical network such as a home network. In one example, the encoder and multiplexer 16 complies with a Moving Pictures Expert Group (MPEG) transport steam (TS) (MPEG-TS) standard.

The receiver 30 of the panoramic video transmission system 100 may include an A/V decoder and de-multiplexer 36, one or more storage devices 32a-32c, which may store decoded video images, storage devices 34, which may store decoded audio data, a capability negotiator 38, a standard-specific Wi-Fi direct connector 40, a panorama processor 46, and a timing synchronizer 40. Video and audio signals that have been processed by the timing synchronizer 40 may be output to a display (not shown) through a video interface 42, and audio signals that have been processed by the timing synchronizer 48 may be output to speakers (not shown) through an audio interface 44.

The capability negotiator 18 of the transmitter 10 and the capability negotiator 38 of the receiver 30 may be used to negotiate a panoramic video capability of the transmitter 10 and the receiver 30, and also to determine an order in which video streams transmitted from the transmitter 10 to the receiver 30 are to be rendered by the receiver 30 in order to display a panoramic image. Specifically, during a real time streaming protocol (RTSP) session, the transmitter 10 may establish communication with the receiver 30 while the receiver 30 is located within a proximate area of the transmitter 10. The transmitter 10 and the receiver 30 may then transmit messages or various parameters to inform each other of their respective video and audio processing capabilities.

Upon establishing contact with the receiver 30, the transmitter 10 may transmit a message to receiver 30 to advertise the capabilities of the transmitter 10, and to determine whether the receiver 30 is capable of processing panoramic video images. If the receiver 30 is not capable of processing panoramic video images, the receiver 30 may simply ignore the received request. Alternately, the receiver 30 may transmit a response indicating that it is not capable of processing panoramic video images.

On the other hand, if the receiver 30 supports the processing of panoramic video images, the transmitter may analyze the response of the receiver 30, and transmit panoramic settings information to the receiver 30 within the RTSP messages. The panoramic settings information may include, but are not limited to, the number of video elementary streams (VESs) to be transmitted in the transport stream, program identifiers (PIDs) that the VESs will be associated with in the MPEG-TS when the video images are transmitted to the receiver 30, and the position that each VES is to be stitched or assembled by the receiver 30. Accordingly, each VES that is received by the receiver 30 may be assembled in the order specified by the PIDs before being rendered. The parameter settings information may also include attributes that assist the panoramic processor 46 of the receiver 30 in stitching or assembling the received panoramic video images. These attributes include, but are not limited to, focal length information, exposure levels, aperture settings, compression formats, and alignment parameters.

The transmitter 10 may transmit video images captured by the one or more video cameras 12 and audio data related to the captured video images to the receiver 30. The receiver 30 may process the video images using parameters or hints received from the transmitter 10, render the segments of the video images in the correct order, and display the images in a time-synchronized manner.

Figure 2:
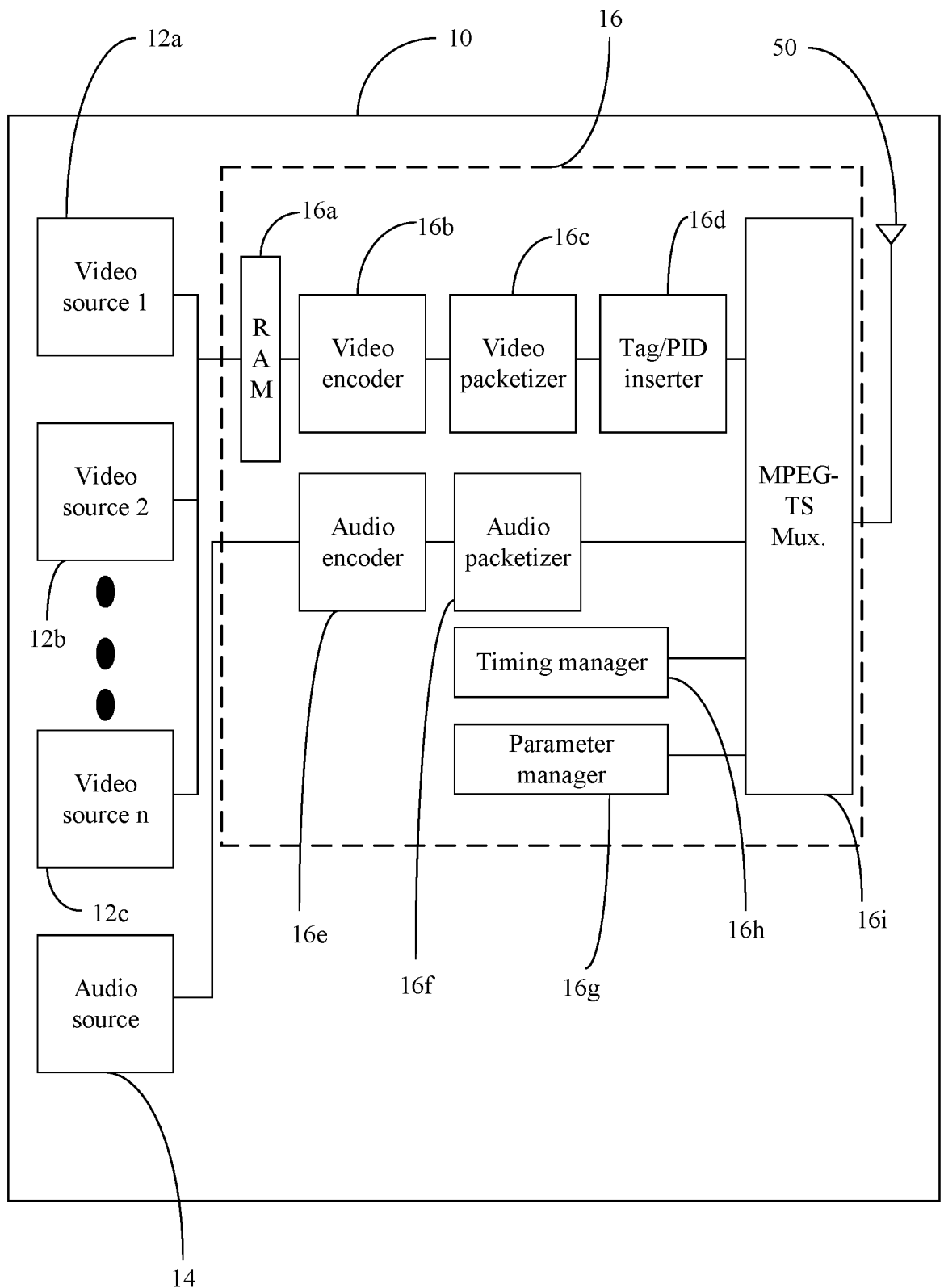
FIG. 2 is a block diagram of an example of a transmitter of a panoramic video transmission system according to an embodiment.

FIG. 2 is a block diagram illustrating an exemplary transmitter 10 that may implement techniques of transmitting video images, audio data, and parameter settings to a receiver. The transmitter 10 may be associated with a wireless display system as illustrated in FIG. 1. The illustrated transmitter 10 includes the one or more video sources 12, one or more audio sources 14, a memory device, for example, a random access memory (RAM) 16a to store images captured by the one or more video sources 12a-12c, a video encoder 16b, a video packetizer 16c, a tag or PID inserter 16d, an audio encoder 16e, an audio packetizer 16f, a parameter manager 16g, a timing manager 16h, a MPEG-TS multiplexer 16i, and an antenna 50.

According to an exemplary embodiment, after images are captured by the one or more video sources 12a-12c, the images may be stored in a memory device 16a. Although the memory device 16a is illustrated as being a RAM, this is only exemplary. The memory device may include a synchronous dynamic RAM (SDRAM), a read-only memory (ROM), an electrically erasable programmable ROM (EEPROM), a non-volatile RAM (NVRAM), etc. The memory 16a may include a computer readable storage medium for storing video images and instructions that may be executed by a processor.

The video encoder 16b may receive video images from the memory device 16a and encode the received images in a desired video encoding format. The video encoder 16b may be a combination of hardware and software elements. The video packetizer 16c may packetize encoded video images received from the video encoder 16b. The video images may be packetized according to various packetization protocols including the MPEG standard. The video packetizer 16c may be implemented as software or hardware or a combination thereof, and may implement aspects of packetized elementary stream (PES) packetization.

Audio encoder 16e may receive audio data from one or more audio sources 14, and encode the received audio data to a desired audio encoding format. The audio encoder 16e may be a combination of hardware and software elements to implement aspects of the audio encoding process. The audio packetizer 16f may packetize the encoded audio data according to MPEG or other packetization protocols. The audio packetizer may be a combination of hardware and software elements to implement aspects of the audio PES packetization process.

A tag or PID inserter 16d may insert a PID to each VES. The MPEG-TS multiplexer 16i may utilize various multiplexing schemes to multiplex the video encoded streams and the audio encoded streams into a single encapsulated MPEG-TS. The MPEG-TS multiplexer 16i may apply time stamps to the video images and audio data in order to allow the receiver 30 (FIG. 1) to easily associate video images to their related audio data. Multiple video streams may be transmitted in the encapsulated MPEG-TS under the same time stamp. The receiver 30 (FIG. 1) may then stitch together the images associated with the particular time stamp as a panoramic image.

The value of the PID that is inserted into the VES determines the position in which each VES will be rendered and displayed by the receiver 30 (FIG. 1). For example, a VES that is annotated with a PID that has a value of "0" may indicate that the VES is to be rendered at the center of the image to be displayed by the receiver 30 (FIG. 1). On the other hand, a VES that is annotated with a PID that has a value of "−1", "−2". . . " −n" may indicate that the specific VES must be displayed at positions to the left of the VES that is annotated with the PID value of "0", and a VES that is annotated with a PID that has a value of "+1", "+2". . . "+n" may indicate that the specific VES must be displayed at positions to the right of the VES that is annotated with the PID value of "0". The PIDs may be transmitted to the receiver 30 (FIG. 1) in a parameter settings list. The receiver 30 may then stitch together the video images in the order specified by the PIDs in the parameter settings list.

Figure 3:
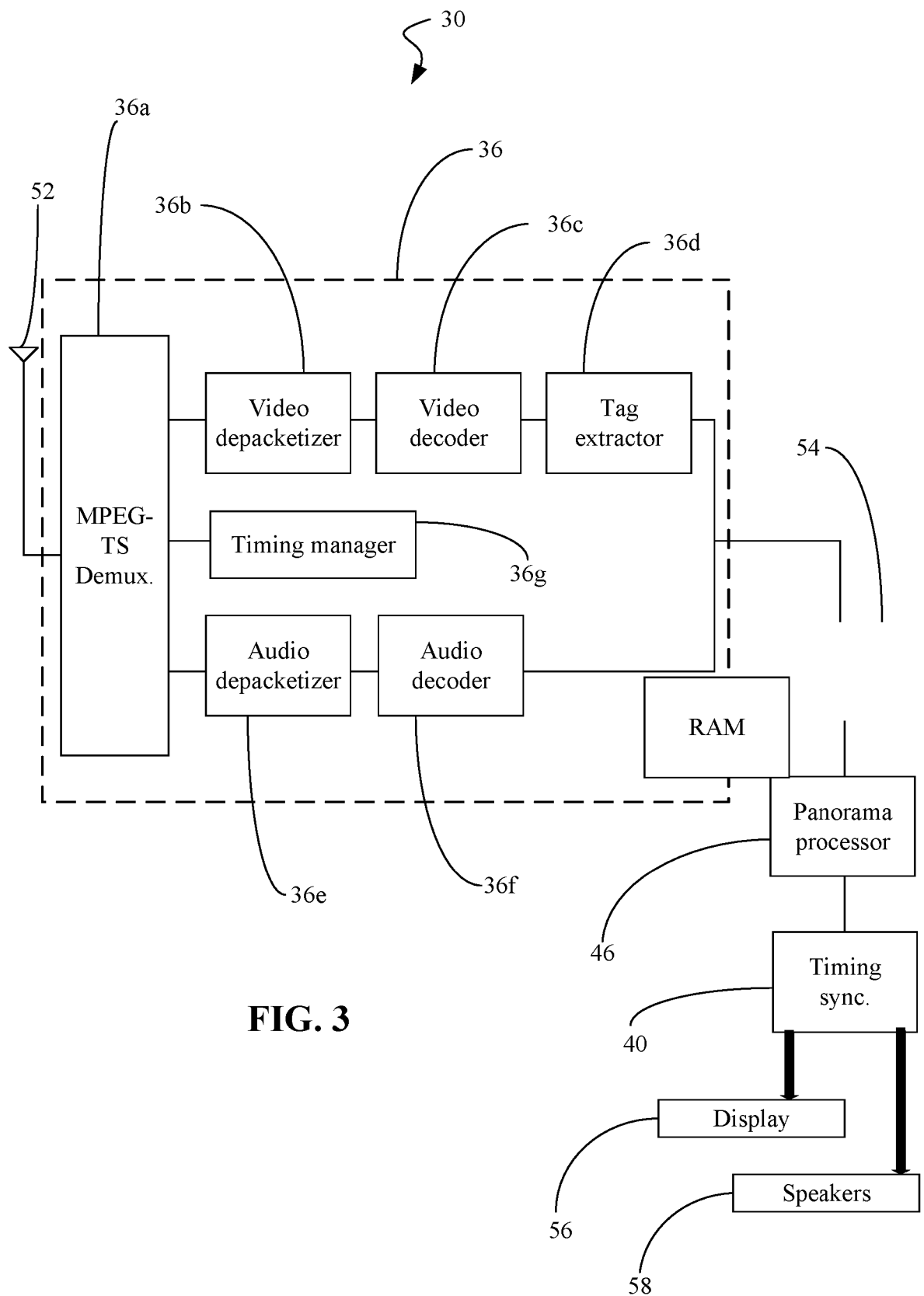
FIG. 3 is a block diagram of an example of a receiver of a panoramic video transmission system according to an embodiment.

Turning now to FIG. 3, a block diagram of an exemplary receiver 30 is illustrated. The receiver includes an antenna 52, an MPEG-TS de-multiplexer 36a, a video de-packetizer 36b, a video decoder 36c, a tag extractor 36d, an audio de-packetizer 36e, an audio decoder 36f, a timing manager 36g, a memory device 54, a panorama processor 46, and a timing synchronizer 40, which outputs video images and audio data to a display device 56 and an audio output device 58.

The MPEG-TS de-multiplexer 36a may receive a video and audio transport stream that is transmitted from a transmitter 10 (FIG. 1), and apply various de-multiplexing processes to the transport stream to separate the audio and video streams from the transport stream. The video de-packetizer 36b and the audio de-packetizer 36e may receive the packetized transport stream and perform reverse processes of the video packetizer 16c (FIG. 2) and the audio packetizer 16f (FIG. 2) to assemble the received audio and video streams or packets into a continuous byte stream.

Similarly, the video decoder 36c and the audio decoder 36f may perform processes that are reciprocal to the processes performed by the video encoder 16b (FIG. 2) and the audio encoder 16e (FIG. 2), and decode the received video streams and audio data.

The timing synchronizer 40 may ensure that the video and audio segments are properly synchronized. Specifically, all of the video elementary streams that have the same time stamp, (which means that these video elementary streams are a part of the same image), are rendered together.

The decoded video streams may be transmitted to a storage device 54 before being rendered. Specifically, the decoded video images will be held in the storage device 54 until all of the video segments that correspond to a single presentation time stamp (PTS) have been received. At this point, all of the audio/video images that correspond to a single PTS may be rendered together and placed in the correct order in the display device 56.

The receiver 30 may present the video images for display in a variety of ways. For example, although the full panoramic image may be assembled, the full panoramic images do not have to be rendered together. Instead, a portion of the image may be rendered, and as the user swipes the screen to the left or the right, the images that correspond to the swiped position may be rendered.

Figure 4:
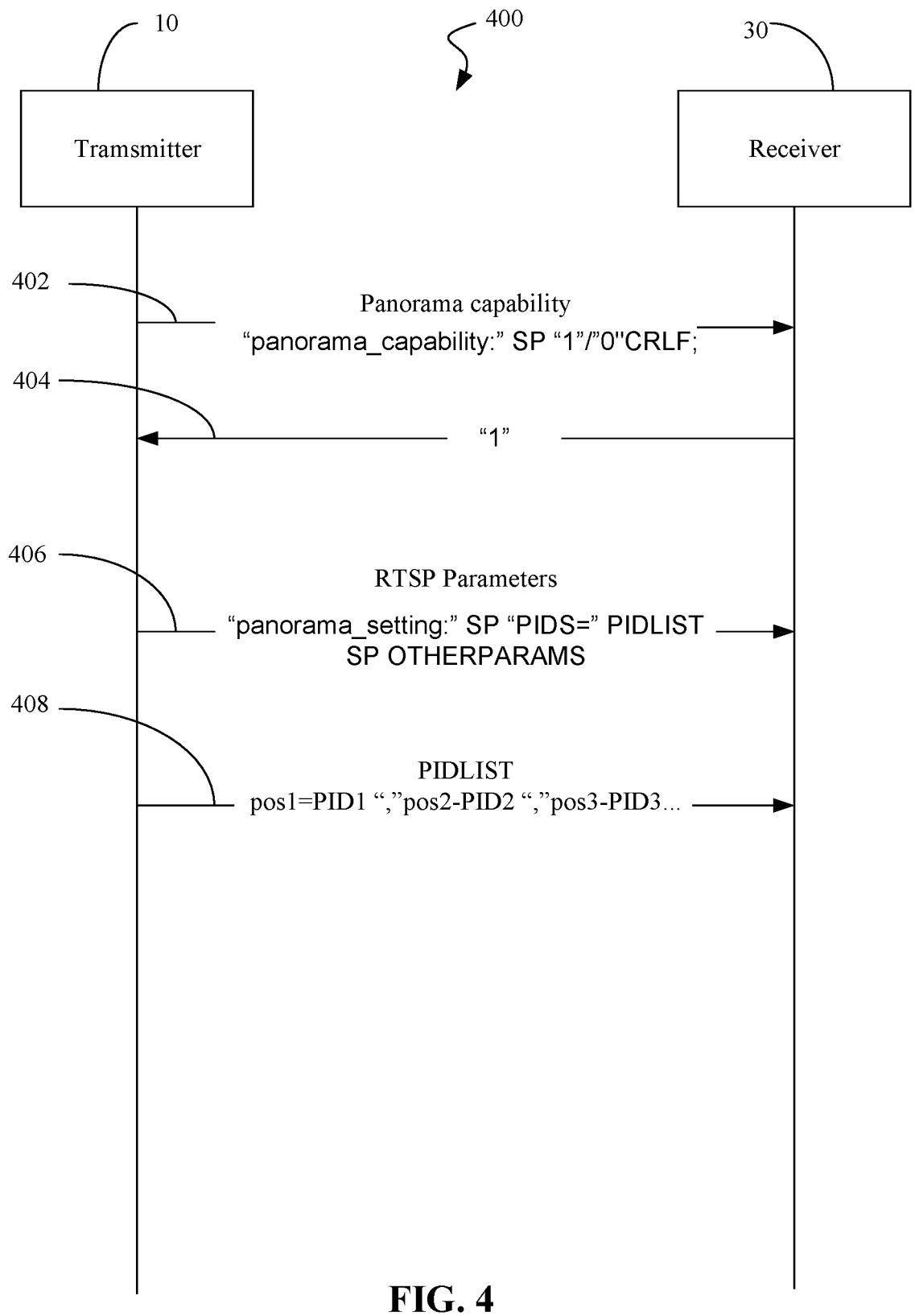
FIG. 4 is a timing diagram of an example of a message transfer sequence between a transmitter and a receiver according to an embodiment.

FIG. 4 illustrates an exemplary message transfer sequence between the transmitter 10 and the receiver 30 as a part of the capability negotiation session. Capability negotiation between the transmitter 10 and the receiver 30 may occur as a part of the general communication establishment session between the transmitter 10 and the receiver 30. The communication may be established by the standard-specific Wi-Fi direct connector 20 (FIG. 1) of the transmitter 10 and the standard-specific Wi-Fi direct connector 40 (FIG. 1) of the receiver 30. This is only exemplary, and any other communication standard may be used by the transmitter 10 and the receiver 30.

The transmitter 10 and the receiver 30 may negotiate settings and panoramic video capabilities via multiple RTSP messages. The transmitter 10 may send a message M1 (not shown) to the receiver 30 to determine the RTSP methods that the receiver 30 may support. The receiver 30 may then respond with a response message M2 (not shown) informing the transmitter 10 of the RTSP methods it is capable of supporting.

The transmitter 10 may then transmit an M3 request message 402 to the receiver 30 to determine whether the receiver 30 is capable of processing panoramic images. The request may take the following form: "intel_panoramic_capability:" SP "1"/"0" CRLF; "1".

The "1" may be transmitted in operation 404 by the receiver 30 to the transmitter 10 to indicate that the receiver 30 is capable of processing panoramic video images. If the receiver 30 is not capable of processing panoramic video images, or does not understand the parameter, the receiver 30 may simply ignore the request.

At operation 406, the transmitter 10 may transmit parameter settings to the receiver 30. These parameter settings may include, but are not limited to, attributes such as focal length and alignment parameters that the receiver 30 may use to stitch or assemble the panoramic video images. The parameters may also include the PID list that the video elementary stream will be associated with in the MPEG-TS stream that is transmitted by the transmitter 10. For example, as illustrated in operation 408, the "pos 1" field may specify the relative position where the video with the PID=1 has to be placed by the receiver during rendering of the panoramic video images. A PID that has a value of "0" may indicate that specified video image has to be placed in the center of the panoramic image. PID values of "1", "2", "3", etc. indicate video images that are to be placed to the right side of the PID that has a value of "0", and PID values of "−1", "−2", "−3", etc. indicate video images that are to be placed to the left side of the PID that has the value of "0".

Figure 5:
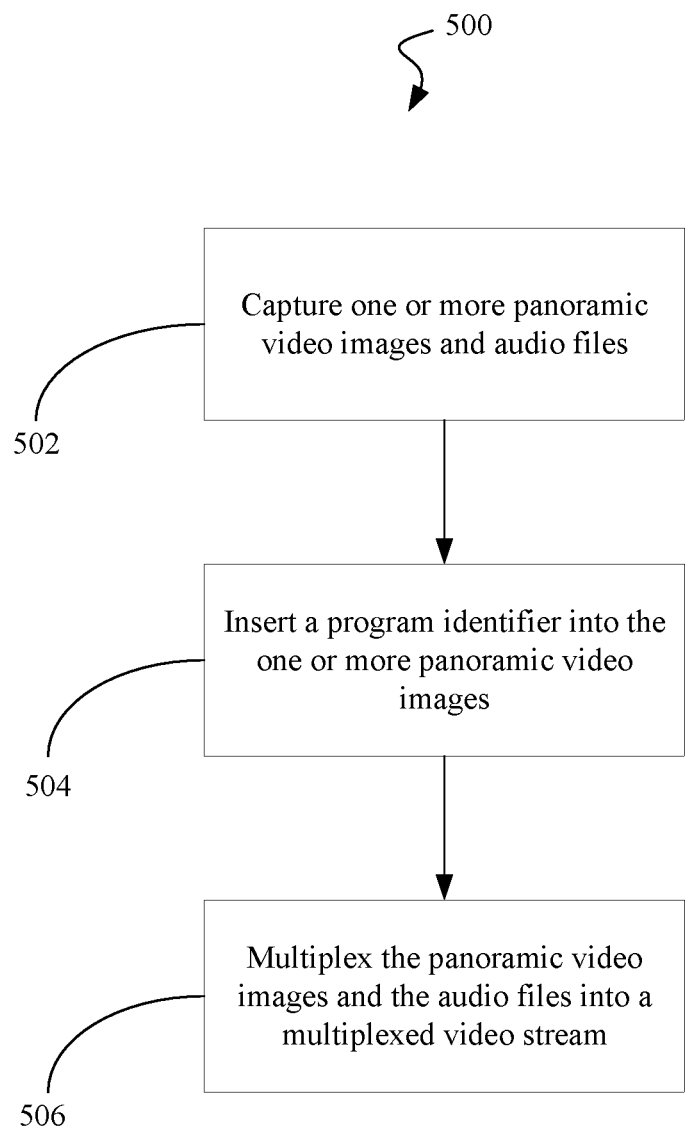
FIG. 5 is a flow chart of an example method of transmitting video images and audio files according to an embodiment.

FIG. 5 illustrates a method 500 of transmitting video images and audio files according to an embodiment. The method 500 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 500 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In illustrated processing block 502, the video image transmission system may use one or more video cameras 12a-12c (FIG. 1) to capture one or more panoramic video images and audio files. The captured audio/video data may be encoded and packetized for transmission, and at processing block 504, a PID may be inserted into each of the captured panoramic video images. The PIDs indicate an order that the panoramic video images will be assembled into by the receiver 30 (FIG. 1).

At processing block 506, the video payload data and the audio payload data may be multiplexed into an MPEG-TS. Specifically, a multiplexer 16 (FIG. 1) may encapsulate packetized elementary video streams and audio data as an MPEG-TS. The multiplexer 16 (FIG. 1) may also add a time stamp to the A/V data in order to provide synchronization for the audio and video packets.

Figure 6:
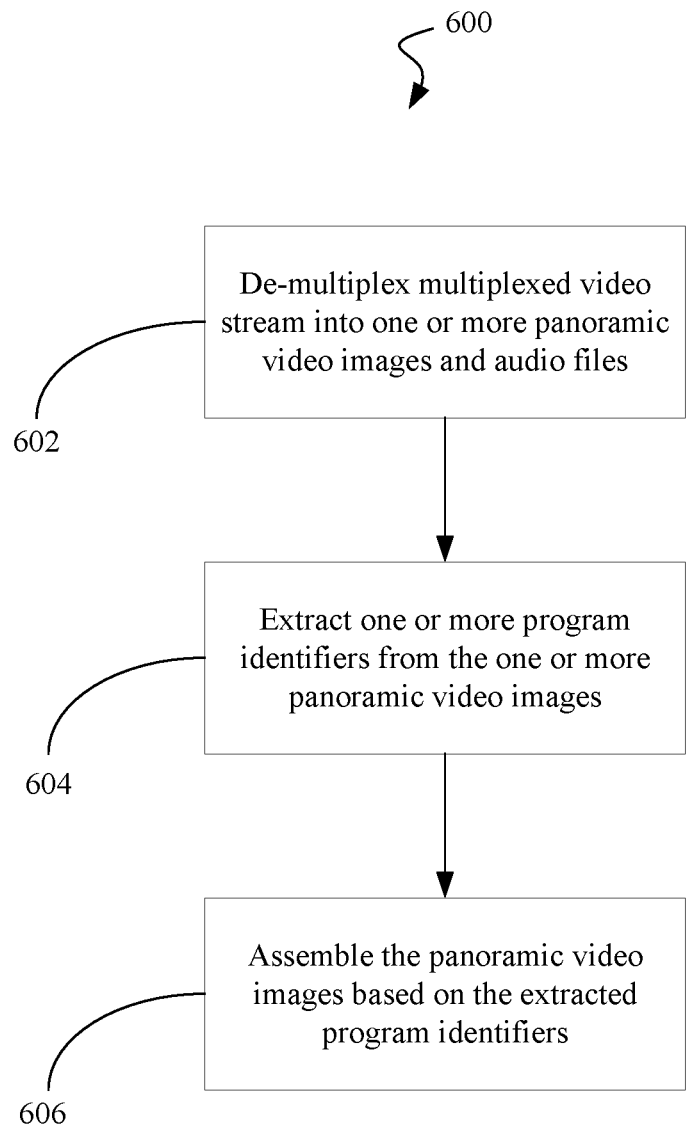
FIG. 6 is a flow chart of an example method of receiving and processing video images and audio files according to an embodiment.

Turning now to FIG. 6, a method 600 of receiving and processing video images and audio files according to an embodiment is illustrated. The method 600 may generally be implemented in a device such as, for example, a smart phone, tablet computer, notebook computer, tablet computer, convertible tablet, PDA, MID, wearable computer, desktop computer, media player, smart TV, gaming console, etc., already discussed. More particularly, the method 600 may be implemented as a set of logic instructions stored in a machine- or computer-readable medium of a memory such RAM, ROM, PROM, firmware, flash memory, etc., in configurable logic such as, for example, PLAs, FPGAs, CPLDs, in fixed-functionality logic hardware using circuit technology such as ASIC, CMOS or TTL technology, or any combination thereof. For example, computer program code to carry out operations shown in method 600 may be written in any combination of one or more programming languages, including an object oriented programming language such as JAVA, SMALLTALK, C++ or the like and conventional procedural programming languages, such as the "C" programming language or similar programming languages.

At processing block 602, a multiplexed audio/video stream may be received at a de-multiplexer 36a (FIG. 1). Various de-multiplexing techniques may be applied to the multiplexed audio/video stream to separate the audio data and the video stream from the MPEG-TS. The de-multiplexed audio/video may then be depacketized and decoded and one or more PIDs may be extracted from the one or more panoramic video images at processing block 604.

At processing block 606, the panoramic video images are stitched together or assembled based on the values of the extracted PIDs. The panoramic video images may then be processed and rendered on a display device in an order that is specified by the PIDs.

Figure 7:
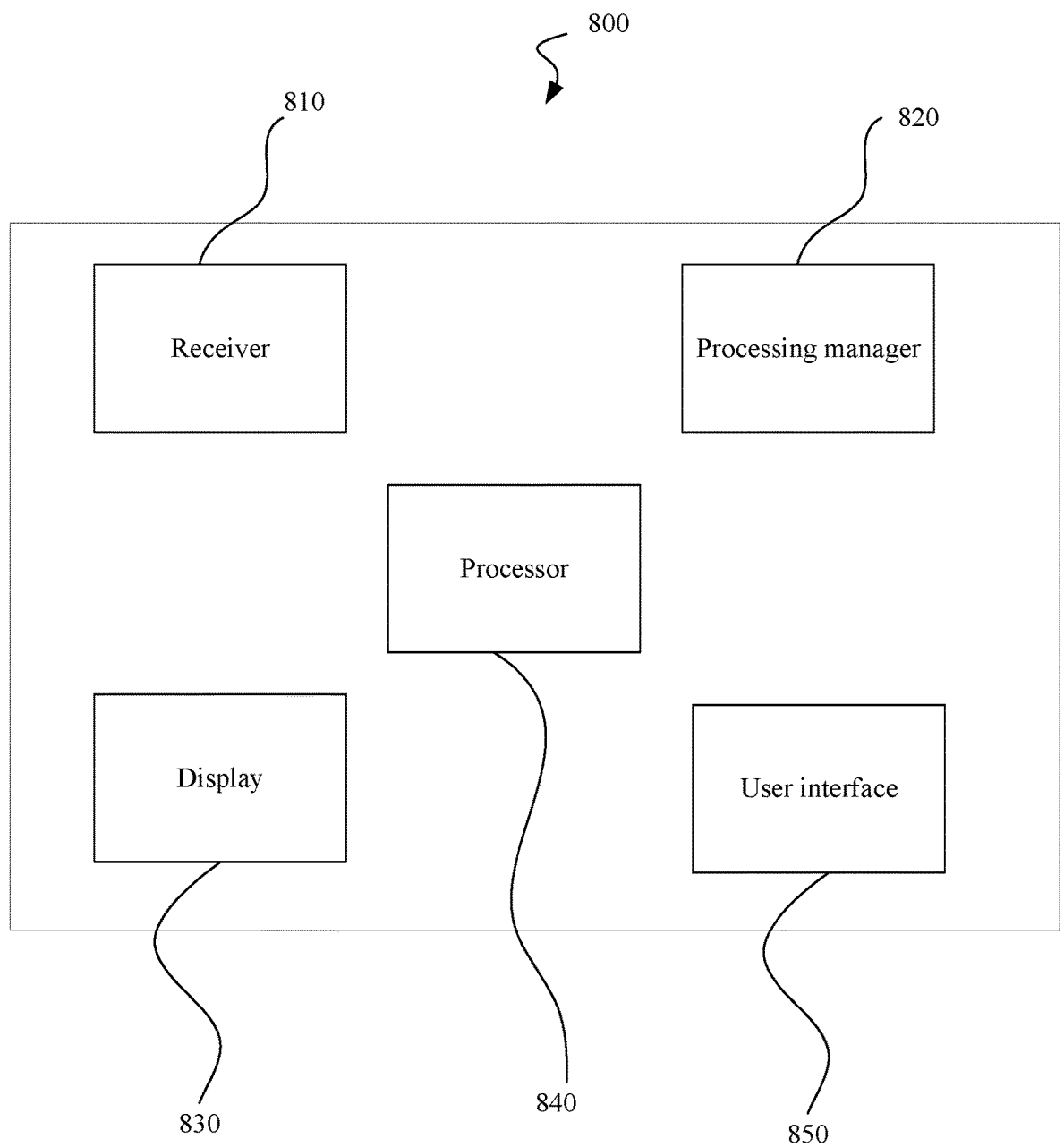
FIG. 7 is a block diagram of a display device according to an embodiment.

FIG. 7 illustrates a display device 800 according to another exemplary embodiment. The display device 800 may include a receiver 810, a processing manager 820, a display 830, a processor 840, and a user interface 850. The processing manager 820 may include the MPEG TS demultiplexer 36a (FIG. 3), the video de-packetizer 36b (FIG. 3), the video decoder 36c (FIG. 3), the tag extractor 36d (FIG. 3), the audio de-packetizer 36e (FIG. 3), the audio decoder 36f (FIG. 3), the timing manager 36g (FIG. 3), the memory device 54 (FIG. 3), the panorama processor 46 (FIG. 3), and the timing synchronizer 40 (FIG. 3), but is not limited thereto.

Figure 8:
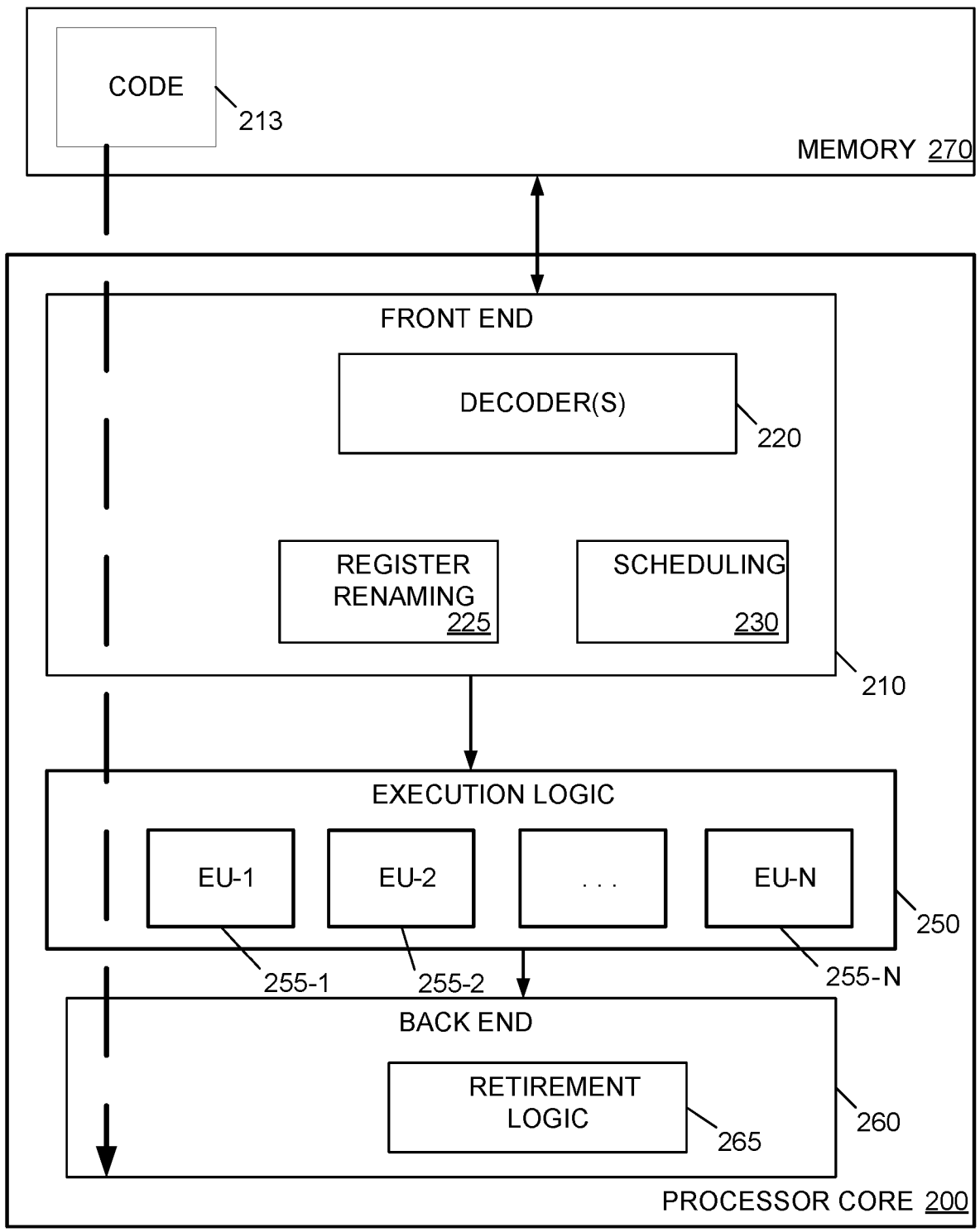
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 500 (FIG. 5), and/or the method 600 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
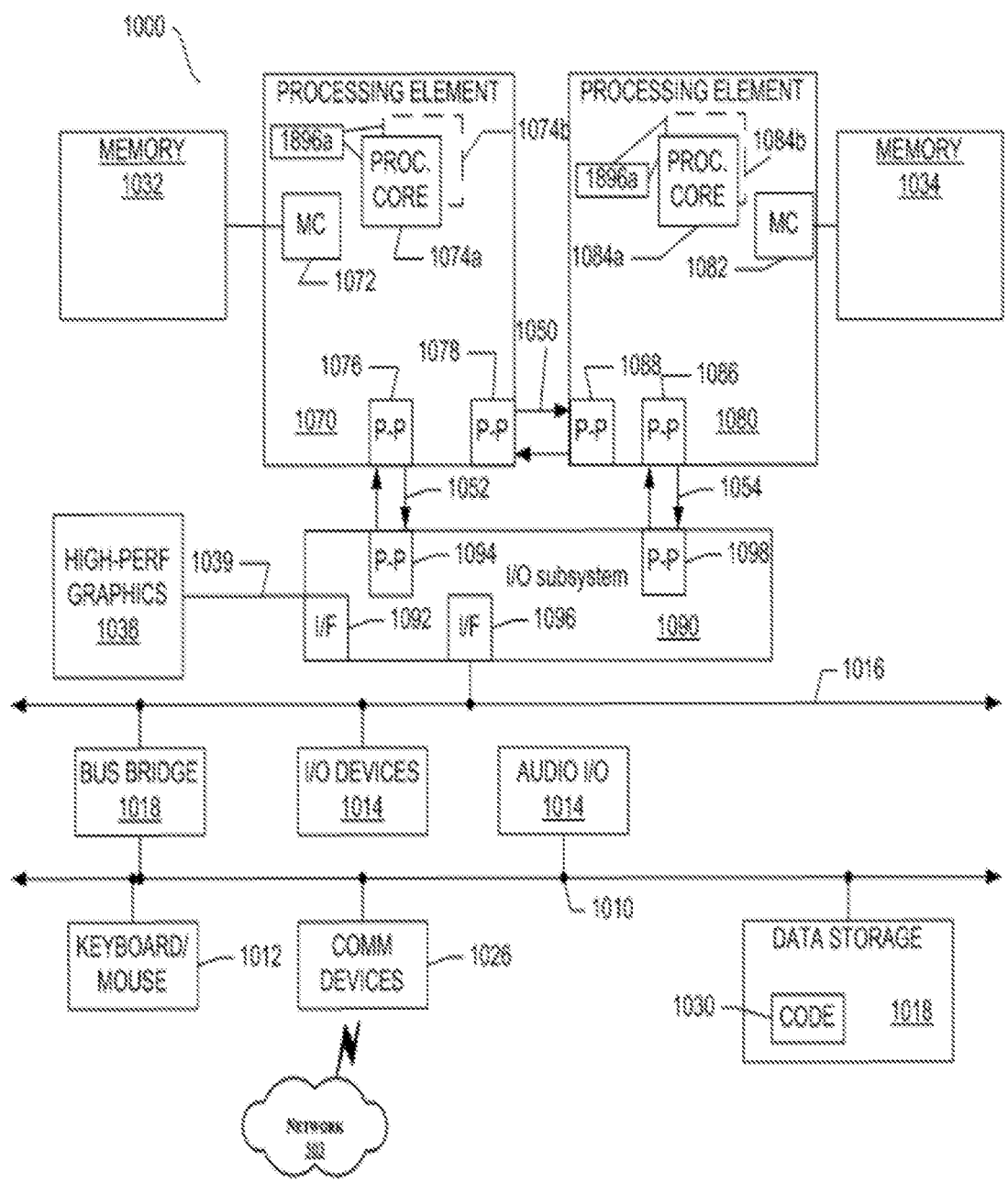
FIG. 9 is a block diagram of an example of a computing system according to an embodiment.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. The I/O devices may also touch screen input devices, wherein the user may give various inputs or control the computing system 1000 via simple or multi-touch gestures by touching the screen with a stylus or one or more fingers. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 500 (FIG. 5), and/or the method 600 (FIG. 6 already discussed, and may be similar to the code 213 (FIG. 8), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples:

Example 1 may include a transmitter to share panoramic images, the transmitter comprising one or more video cameras to capture one or more panoramic video images and audio files, a tag inserter communicatively coupled to at least one of the one or more cameras, the tag inserter to insert a program identifier (PID) into each of the panoramic video images, and a multiplexer device communicatively coupled to the tag inserter, the multiplexer device to multiplex the one or more panoramic video images and the audio files into a multiplexed video stream.

Example 2 may include the transmitter of example 1, wherein the PID is to indicate relative positions that the one or more panoramic video images are to be placed in during a rendering process.

Example 3 may include the transmitter of example 1, further including a capability negotiator to generate panoramic video capability requests and process panoramic video capability responses.

Example 4 may include the transmitter of example 1, further including a parameter manager to generate real time streaming protocol (RTSP) parameters to interpret the panoramic video images.

Example 5 may include the transmitter of example 1, further including a timing manager to attach a presentation time stamp (PTS) to each video segment of the panoramic video images.

Example 6 may include the transmitter of any one of examples 1 to 5, wherein the multiplexed video stream is a Moving Pictures Expert Group (MPEG) transport stream (TS).

Example 7 may include a receiver to receive and process panoramic images, the receiver comprising a demultiplexer to demultiplex a multiplexed video stream into one or more panoramic video images and audio files, a tag extractor communicatively coupled to the demultiplexer, the tag extractor to extract one or more program identifiers (PIDs) from the one or more panoramic video images, and a panoramic video processor communicatively coupled to the tag extractor, the panoramic view processor to assemble the panoramic video images into a panoramic video presentation based on the extracted one or more PIDs.

Example 8 may include the receiver of example 7, wherein the PIDs are to indicate relative positions that the one or more panoramic video images are to be placed in during a rendering process.

Example 9 may include the receiver of example 7, further including a capability negotiator to generate panoramic video capability response messages and process panoramic video capability request messages.

Example 10 may include the receiver of example 7, further including a timing synchronizer to synchronize the one or more panoramic video images with the audio files.

Example 11 may include the receiver of example 7, further including a timing manager to extract a presentation time stamp (PTS) from each video segment of the panoramic video images.

Example 12 may include the receiver of any one of examples 7 to 11, wherein the multiplexed video stream is a Moving Pictures Expert Group (MPEG) transport stream (TS).

Example 13 may include a method of operating a transmitter, comprising capturing, by one or more video cameras, one or more panoramic video images and audio files, inserting a program identifier (PID) into the panoramic video images, and multiplexing the one or more panoramic video images and the audio files into a multiplexed video stream.

Example 14 may include the method of example 13, wherein the PID is to indicate relative positions that the one or more panoramic video images are to be placed in during a rendering process.

Example 15 may include the method of example 13, further including generating panoramic video capability messages, and transmitting the panoramic video capability messages.

Example 16 may include the method of example 13, further including generating real time streaming protocol (RTSP) parameters to interpret the panoramic video images.

Example 17 may include the method of example 13, further including attaching a presentation time stamp (PTS) to a plurality of video segments of the panoramic video images.

Example 18 may include the method of any one of examples 13 to 17, wherein the multiplexed video stream is a Moving Pictures Expert Group (MPEG) transport stream (TS).

Example 19 may include a method of operating a receiver, comprising demultiplexing a multiplexed video stream into one or more panoramic video images and audio files, extracting one or more program identifiers (PIDs) from the one or more panoramic video images, and assembling the panoramic video images into a panoramic video presentation based on the extracted one or more PIDs.

Example 20 may include the method of example 19, wherein the PIDs are to indicate relative positions that the one or more panoramic video images are to be placed in during a rendering process.

Example 21 may include the method of example 19, further including generating panoramic video capability response messages and processing panoramic video capability request messages.

Example 22 may include the method of example 19, further including synchronizing the one or more panoramic video images and with audio files.

Example 23 may include the method of example 19, further including extracting a presentation time stamp (PTS) from each video segment of the panoramic video images.

Example 24 may include the method of any one of examples 19 to 23, wherein the multiplexed video stream is a Moving Pictures Expert Group (MPEG) transport stream (TS).

Example 25 may include at least one non-transitory computer readable storage medium comprising a set of instructions, which when executed by an apparatus, cause the apparatus to capture, by one or more video cameras, one or more panoramic video images and audio files, insert a program identifier (PID) into the one or more panoramic video images, and multiplex the one or more panoramic video images and the audio files into a multiplexed video stream.

Example 26 may include the at least one non-transitory computer readable storage medium of example 25, wherein the PID is to indicate relative positions that the one or more panoramic video images are to be placed in during a rendering process.

Example 27 may include the at least one non-transitory computer readable storage medium of example 25, further including: generating panoramic video capability messages; and transmitting the panoramic video capability messages.

Example 28 may include the at least one non-transitory computer readable storage medium of example 25, further including generating real time streaming protocol (RTSP) parameters to interpret the panoramic video images.

Example 29 may include the at least one non-transitory computer readable storage medium of example 25, further including attaching a presentation time stamp (PTS) to a plurality of video segments of the panoramic video images.

Example 30 may include the at least one non-transitory computer readable storage medium of any one of examples 25 to 29, wherein the multiplexed video stream is a Moving Pictures Expert Group (MPEG) transport stream (TS).

Example 31 may include at least one non-transitory computer readable storage medium comprising a set of instructions, which when executed by an apparatus, cause the apparatus to demultiplex a multiplexed video stream into one or more panoramic video images and audio files, extract one or more program identifiers (PIDs) from the one or more panoramic video images, and assemble the panoramic video images into a panoramic video presentation based on the extracted one or more PIDs.

Example 32 may include the at least one non-transitory computer readable storage medium of example 31, wherein the PIDs are to indicate relative positions that the one or more panoramic video images are to be placed in during a rendering process.

Example 33 may include the at least one non-transitory computer readable storage medium of example 31, further including generating panoramic video capability response messages and processing panoramic video capability request messages.

Example 34 may include the at least one non-transitory computer readable storage medium of example 31, further including synchronizing the one or more panoramic video images with the audio files.

Example 35 may include the at least one non-transitory computer readable storage medium of example 31, further including extracting a presentation time stamp (PTS) from each video segment of the panoramic video images.

Example 36 may include the at least one non-transitory computer readable storage medium of any one of examples 31 to 35, wherein the multiplexed video stream is a Moving Pictures Expert Group (MPEG) transport stream (TS).

Example 37 may include a transmitter for sharing panoramic images, the transmitter comprising means for capturing, by one or more video cameras, one or more panoramic video images and audio files, means for inserting a program identifier (PID) into the panoramic video images, and means for multiplexing the one or more panoramic video images and the audio files into a multiplexed video stream.

Example 38 may include the transmitter of example 37, wherein the PID is to indicate relative positions that the one or more panoramic video images are to be placed in during a rendering process.

Example 39 may include the transmitter of example 37, further including means for generating panoramic video capability messages, and means for transmitting the panoramic video capability messages.

Example 40 may include the transmitter of example 37, further including means for generating real time streaming protocol (RTSP) parameters to interpret the panoramic video images.

Example 41 may include the transmitter of example 37, further including means for attaching a presentation time stamp (PTS) to a plurality of video segments of the panoramic video images.

Example 42 may include the transmitter of any one of examples 37 to 41, wherein the multiplexed video stream is a Moving Pictures Expert Group (MPEG) transport stream (TS).

Example 43 may include a receiver for receiving and processing panoramic images, the receiver comprising means for demultiplexing a multiplexed video stream into one or more panoramic video images and audio files, means for extracting one or more program identifiers (PIDs) from the one or more panoramic video images, and means for assembling the panoramic video images into a panoramic video presentation based on the extracted one or more PIDs.

Example 44 may include the receiver of example 43, wherein the PIDs are to indicate relative positions that the one or more panoramic video images are to be placed in during a rendering process.

Example 45 may include the receiver of example 43, further including means for generating panoramic video capability response messages and processing panoramic video capability request messages.

Example 46 may include the receiver of example 43, further including means for synchronizing the one or more panoramic video images with the audio files.

Example 47 may include the receiver of example 43, further including means for extracting a presentation time stamp (PTS) from each video segment of the panoramic video images.

Example 48 may include the receiver of any one of examples 19 to 23, wherein the multiplexed video stream is a Moving Pictures Expert Group (MPEG) transport stream (TS).

Embodiments described herein are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A transmitter comprising:
   one or more video cameras to capture one or more panoramic video images and audio files;
   a tag inserter communicatively coupled to at least one of the one or more cameras, the tag inserter to insert a program identifier (PID) into each of the panoramic video images;
   a multiplexer device communicatively coupled to the tag inserter, the multiplexer device to multiplex the one or more panoramic video images and the audio files into a multiplexed video stream, and
   a capability negotiator to transmit real time streaming protocol (RTSP) messages to negotiate settings and panoramic video capabilities, the RTSP messages including a message from the transmitter to a receiver to determine the RTSP methods that the receiver supports and a message from the transmitter to the receiver to determine whether the receiver is capable of processing panoramic images,
   wherein if the receiver is capable of processing the panoramic images, the transmitter transmits panoramic settings information to the receiver within the RTSP messages, the panoramic settings information including the number of video elementary streams (VESs) to be transmitted, PIDs that the VESs will be associated with in an MPEG transport stream when the panoramic video images are transmitted to the receiver, and a position to which each VES is to be stitched or assembled by the receiver.

2. The transmitter of claim 1, wherein the PID is to indicate relative positions that the one or more panoramic video images are to be placed in during a rendering process.

3. The transmitter of claim 1, wherein the capability negotiator generates panoramic video capability requests and processes panoramic video capability responses.

4. The transmitter of claim 1, further including a parameter manager to generate real time streaming protocol (RTSP) parameters to interpret the panoramic video images.

5. The transmitter of claim 1, further including a timing manager to attach a presentation time stamp (PTS) to each video segment of the panoramic video images.

6. The transmitter of claim 1, wherein the multiplexed video stream is a Moving Pictures Expert Group (MPEG) transport stream (TS).

7. A receiver comprising:
   a demultiplexer to demultiplex a multiplexed video stream into one or more panoramic video images and audio files;
   a tag extractor communicatively coupled to the demultiplexer, the tag extractor to extract one or more program identifiers (PIDs) from the one or more panoramic video images;
   a panoramic video processor communicatively coupled to the tag extractor, the panoramic view processor to assemble the panoramic video images into a panoramic video presentation based on the extracted one or more PIDs; and
   a capability negotiator to receive from a transmitter real time streaming protocol (RTSP) messages to negotiate settings and panoramic video capabilities, the RTSP messages including a message to determine the RTSP methods that the receiver supports and a to determine whether the receiver is capable of processing panoramic images, wherein if the receiver is capable of processing the panoramic images, the receiver receives panoramic settings information within the RTSP messages from the transmitter, the panoramic settings information including the number of video elementary streams (VESs) to be received, PIDs that the VESs will be associated with in an MPEG transport stream when the panoramic video images are received by the receiver, and a position to which each VES is to be stitched or assembled.

8. The receiver of claim 7, wherein the PIDs are to indicate positions that the one or more panoramic video images are to be placed in during a rendering process.

9. The receiver of claim 7, wherein the capability negotiator generates panoramic video capability response messages and processes panoramic video capability request messages.

10. The receiver of claim 7, further including a timing synchronizer to synchronize the one or more panoramic video images with the audio files.

11. The receiver of claim 7, further including a timing manager to extract a presentation time stamp (PTS) from each video segment of the panoramic video images.

12. The receiver of claim 7, wherein the multiplexed video stream is a Moving Pictures Expert Group (MPEG) transport stream (TS).

13. A method comprising:
capturing, by one or more video cameras, one or more panoramic video images and audio files;
inserting a program identifier (PID) into the panoramic video images;
multiplexing the panoramic video images and the audio files into a multiplexed video stream;
transmitting real time streaming protocol (RTSP) messages to negotiate settings and panoramic video capabilities, the RTSP messages including a message from a transmitter to a receiver to determine the RTSP methods that the receiver supports and a message from the transmitter to the receiver to determine whether the receiver is capable of processing panoramic images; and
if the receiver is capable of processing the panoramic images, transmitting panoramic settings information to the receiver within the RTSP messages, the panoramic settings information including the number of video elementary streams (VESs) to be transmitted, PIDs that the VESs will be associated with in an MPEG transport stream when the panoramic video images are transmitted to the receiver, and a position to which each VES is to be stitched or assembled by the receiver.

14. The method of claim 13, wherein the PID is to indicate positions that the one or more panoramic video images are to be placed during a rendering process.

15. The method of claim 13, further including:
generating panoramic video capability messages; and
transmitting the panoramic video capability messages.

16. The method of claim 13, further including generating real time streaming protocol (RTSP) parameters to interpret the panoramic video images.

17. The method of claim 13, further including attaching a presentation time stamp (PTS) to a plurality of video segments of the panoramic video images.

18. The method of claim 13, wherein the multiplexed video stream is a Moving Pictures Expert Group (MPEG) transport stream (TS).

19. A method comprising:
demultiplexing a multiplexed video stream into one or more panoramic video images and audio files;
extracting one or more program identifiers (PIDs) from the one or more panoramic video images;
assembling the panoramic video images into a panoramic video presentation based on the extracted one or more PIDs;
receiving real time streaming protocol (RTSP) messages to negotiate settings and panoramic video capabilities, the RTSP messages including a message from a transmitter to a receiver to determine the RTSP methods that the receiver supports and a message to determine whether the receiver is capable of processing panoramic images, and
if the receiver is capable of processing the panoramic images, receiving panoramic settings information within the RTSP messages from the transmitter, the panoramic settings information including the number of video elementary streams (VESs) to be received, PIDs that the VESs will be associated with in an MPEG transport stream when the panoramic video images are received by the receiver, and a position to which each VES is to be stitched or assembled.

20. The method of claim 19, wherein the PIDs are to indicate positions that the one or more panoramic video images are to be placed during a rendering process.

21. The method of claim 19, further including generating panoramic video capability response messages and processing panoramic video capability request messages.

22. The method of claim 19, further including synchronizing the panoramic video images with the audio files.

23. The method of claim 19, further including extracting a presentation time stamp (PTS) from each video segment of the panoramic video images.

24. At least one non-transitory computer readable storage medium comprising a set of instructions, which when executed by an apparatus, cause the apparatus to:
capture, by one or more video cameras, one or more panoramic video images and audio files;
insert a program identifier (PID) into the panoramic video images;
multiplex the panoramic video images and the audio files into a multiplexed video stream;
transmit real time streaming protocol (RTSP) messages to negotiate settings and panoramic video capabilities, the RTSP messages including a message from a transmitter to a receiver to determine the RTSP methods that the receiver supports and a message from the transmitter to the receiver to determine whether the receiver is capable of processing panoramic images, and
if the receiver is capable of processing the panoramic images, transmit panoramic settings information to the receiver within the RTSP messages, the panoramic settings information including the number of video elementary streams (VESs) to be transmitted, PIDs that the VESs will be associated with in an MPEG transport stream when the panoramic video images are transmitted to the receiver, and a position to which each VES is to be stitched or assembled by the receiver.

25. At least one non-transitory computer readable storage medium comprising a set of instructions, which when executed by an apparatus, cause the apparatus to:

demultiplex a multiplexed video stream into one or more panoramic video images and audio files;
extract one or more program identifiers (PIDs) from the one or more panoramic video images;
assemble the panoramic video images based on the extracted one or more PIDs;
receive real time streaming protocol (RTSP) messages to negotiate settings and panoramic video capabilities, the RTSP messages including a message from a transmitter to a receiver to determine the RTSP methods that the receiver supports and a message to determine whether the receiver is capable of processing panoramic images, and
if the receiver is capable of processing the panoramic images, receive panoramic settings information within the RTSP messages from the transmitter, the panoramic settings information including the number of video elementary streams (VESs) to be received, PIDs that the VESs will be associated with in an MPEG transport stream when the panoramic video images are received by the receiver, and a position to which each VES is to be stitched or assembled.

\* \* \* \* \*